Figure 1:
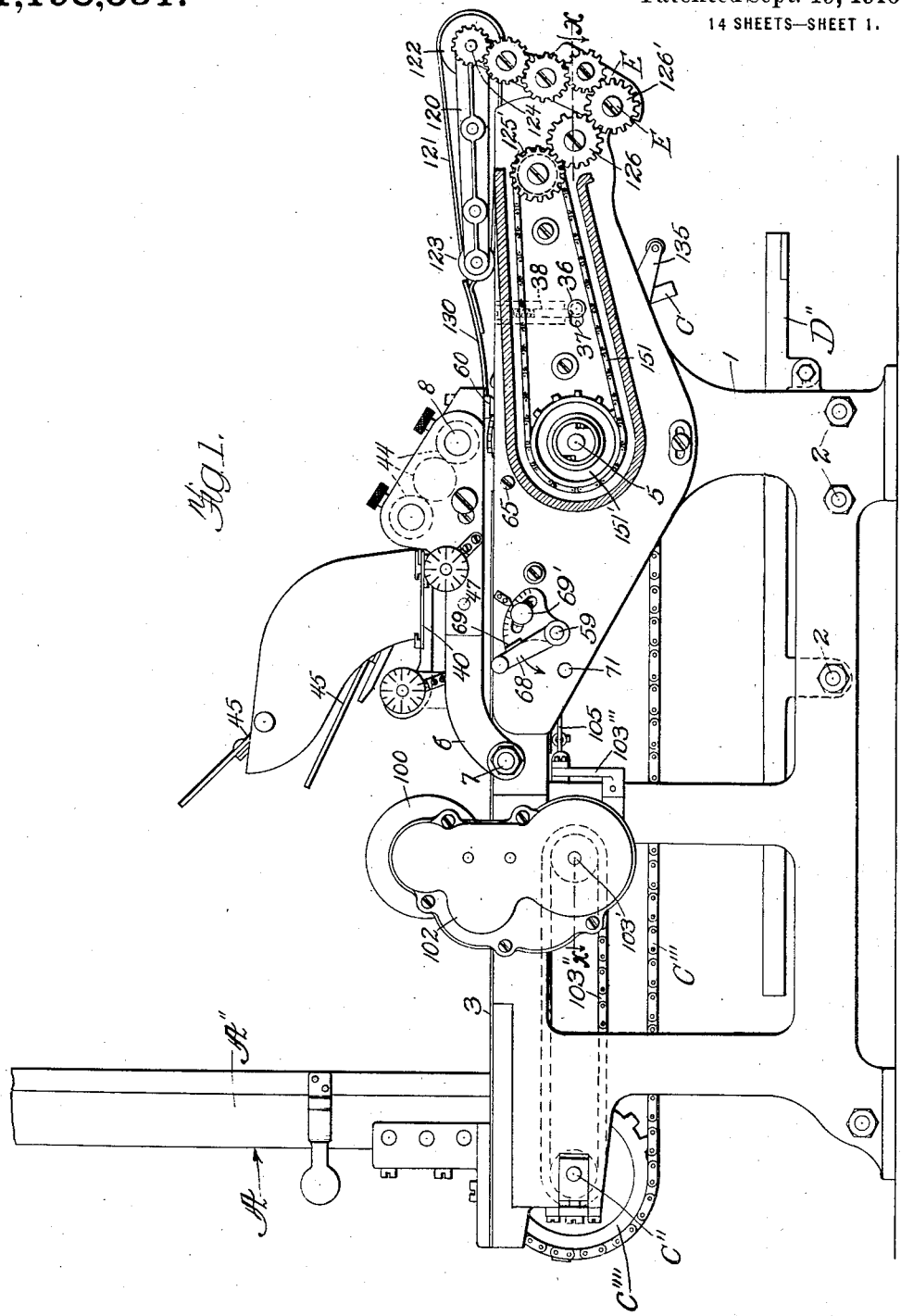

D. C. HUGHES.
MULTIPRINTING AND ADDRESSING MACHINE.
APPLICATION FILED OCT. 22, 1910.

1,198,551. Patented Sept. 19, 1916.
14 SHEETS—SHEET 2.

Witnesses:
Robert N. Weir
J. N. Daggett.

Inventor
Dawydd C. Hughes
By [signature]
Atty

D. C. HUGHES.
MULTIPRINTING AND ADDRESSING MACHINE.
APPLICATION FILED OCT. 22, 1910.

1,198,551.

Patented Sept. 19, 1916.
14 SHEETS—SHEET 7.

Witnesses
Robert N. Weir
J. N. Daggett.

Inventor:
Davydd C. Hughes
By:
Attys.

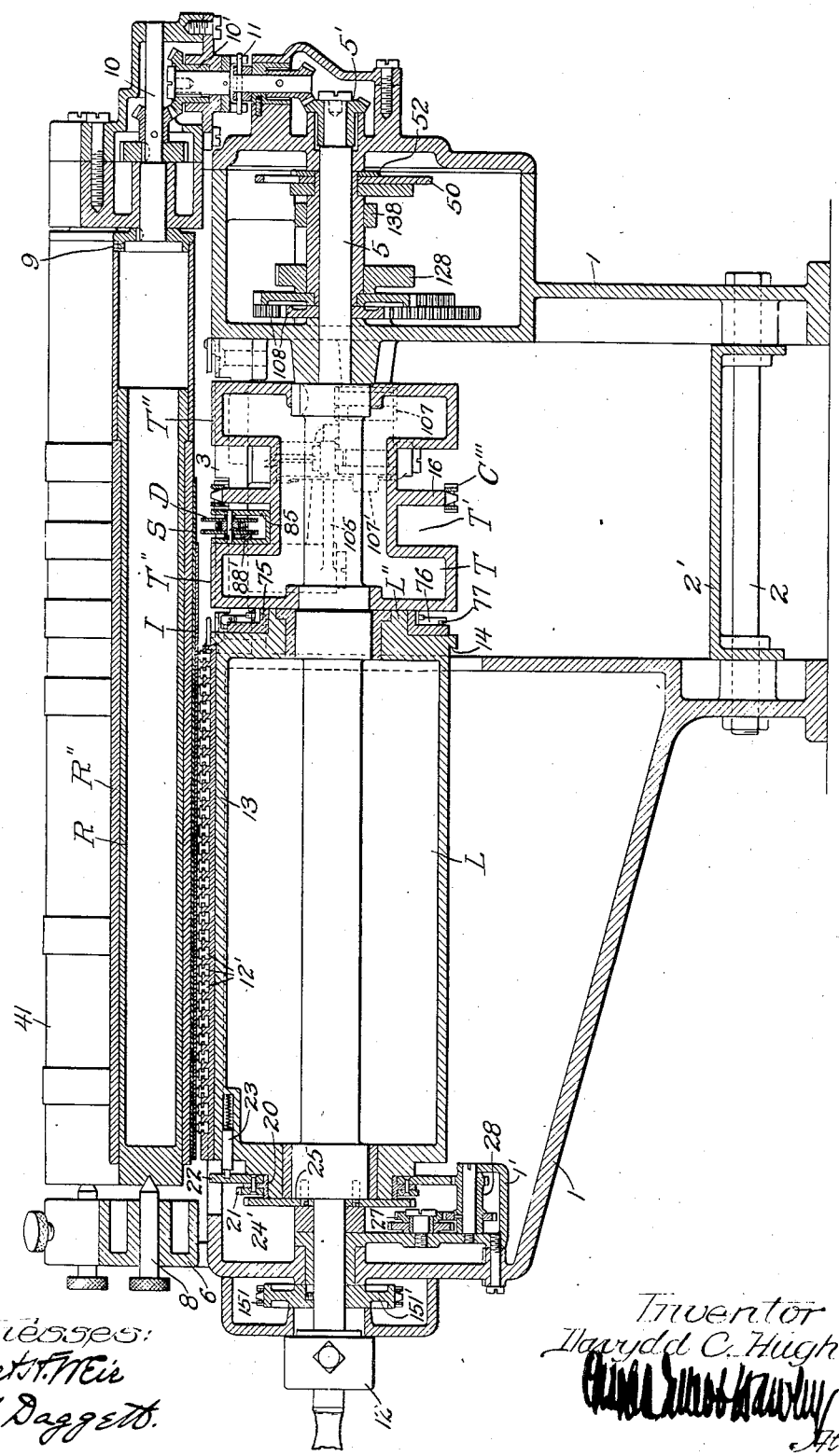

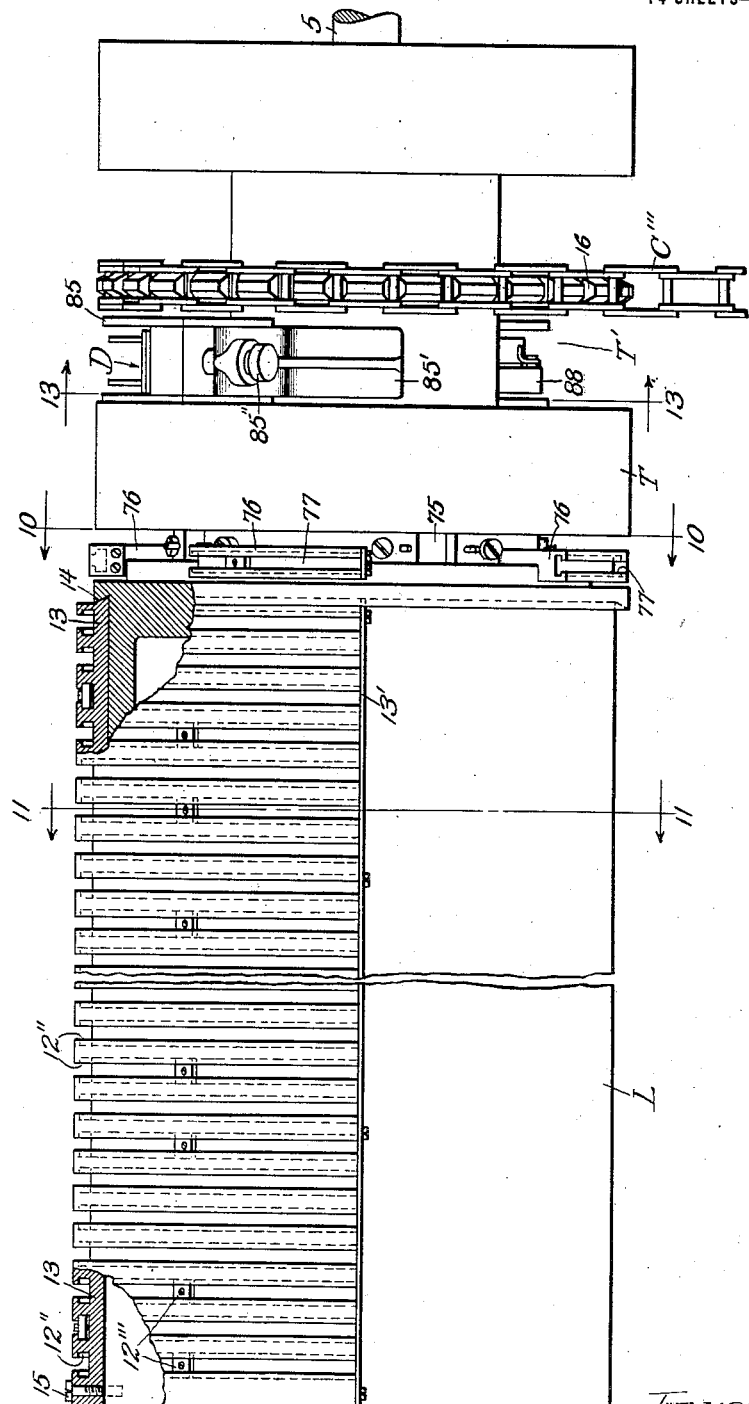

D. C. HUGHES.
MULTIPRINTING AND ADDRESSING MACHINE.
APPLICATION FILED OCT. 22, 1910.
1,198,551.
Patented Sept. 19, 1916.
14 SHEETS—SHEET 10.
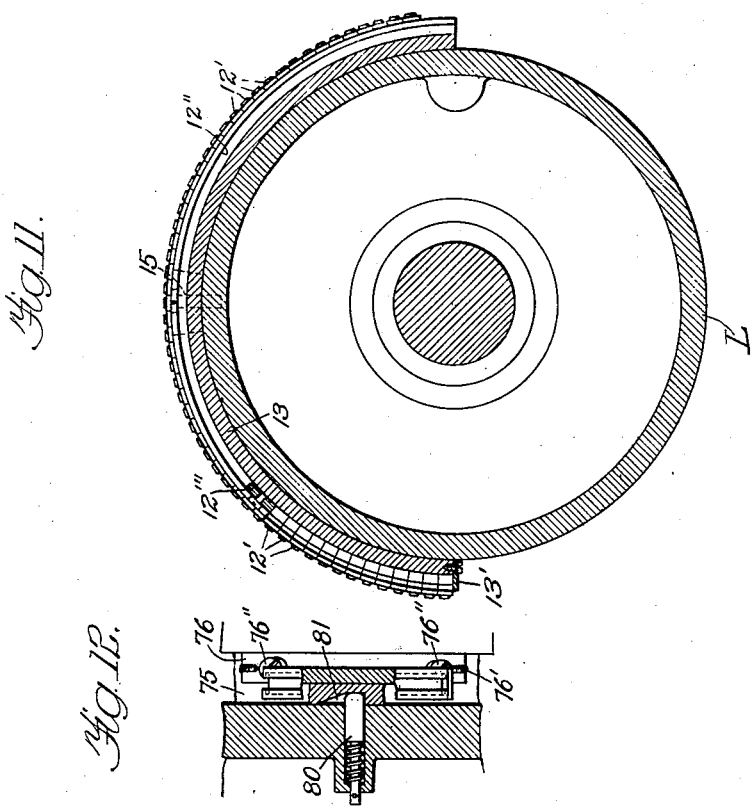
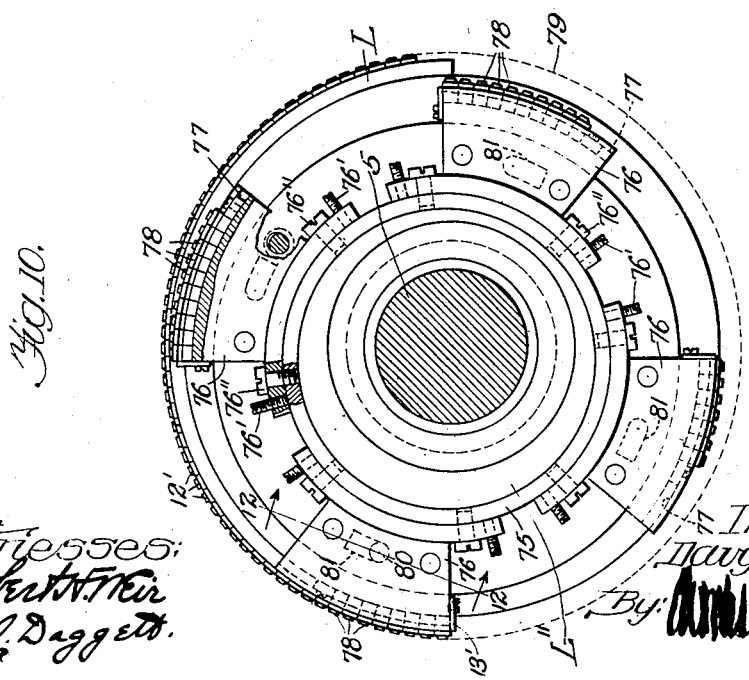

D. C. HUGHES.
MULTIPRINTING AND ADDRESSING MACHINE.
APPLICATION FILED OCT. 22, 1910.

1,198,551.

Patented Sept. 19, 1916.
14 SHEETS—SHEET 11.

Witnesses
Robert H. Weir
J. N. Daggett.

Inventor:
Davydd C. Hughes
By: [signature]
Atty.

D. C. HUGHES.
MULTIPRINTING AND ADDRESSING MACHINE.
APPLICATION FILED OCT. 22, 1910.
1,198,551.
Patented Sept. 19, 1916.
14 SHEETS—SHEET 12.
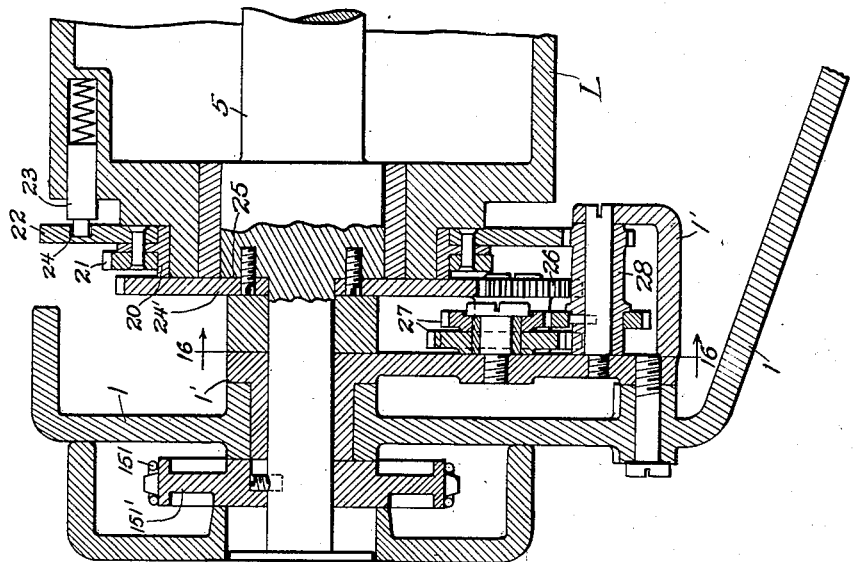
Fig. 17.
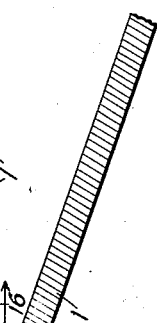
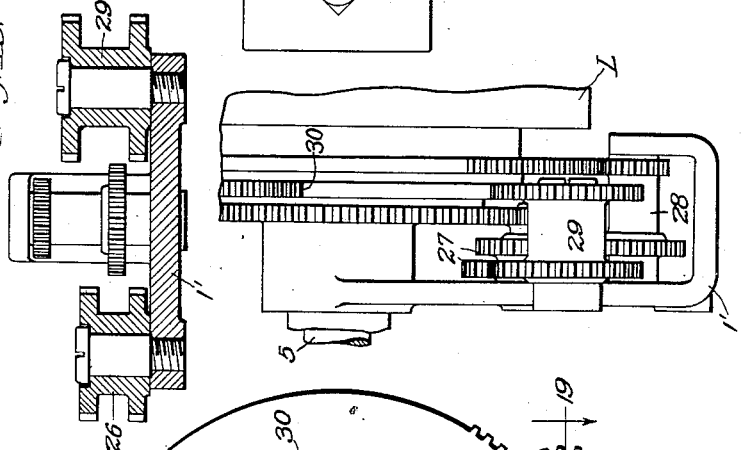
Fig. 19.    Fig. 18.
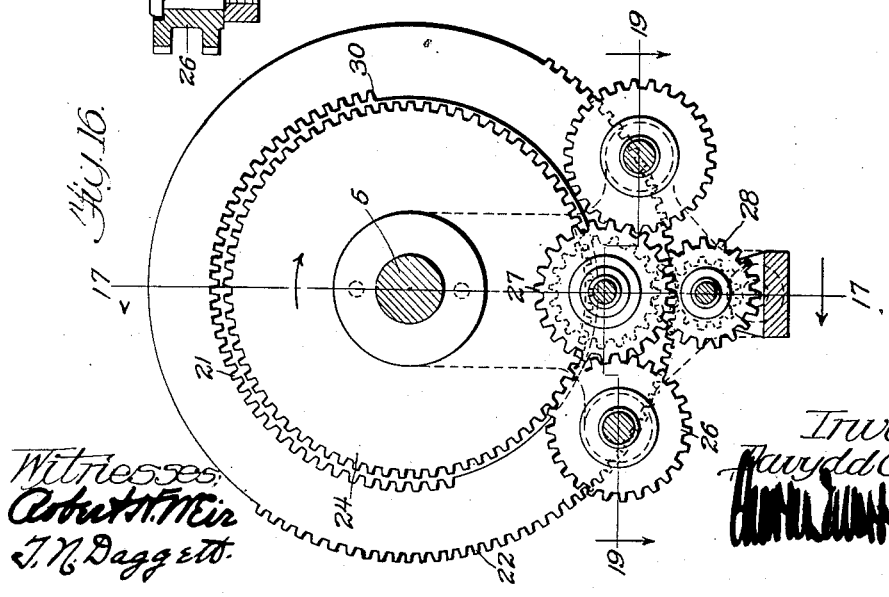
Fig. 16.
Witnesses:
Inventor
Dawydd C. Hughes D. C. HUGHES.
MULTIPRINTING AND ADDRESSING MACHINE.
APPLICATION FILED OCT. 22, 1910.

1,198,551.

Patented Sept. 19, 1916.
14 SHEETS—SHEET 13.

Witnesses
Robert A. Weir
T. N. Daggett

Inventor:
Dawydd C. Hughes
By
Atty.

D. C. HUGHES.
MULTIPRINTING AND ADDRESSING MACHINE.
APPLICATION FILED OCT. 22, 1910.
1,198,551.
Patented Sept. 19, 1916.
14 SHEETS—SHEET 14.
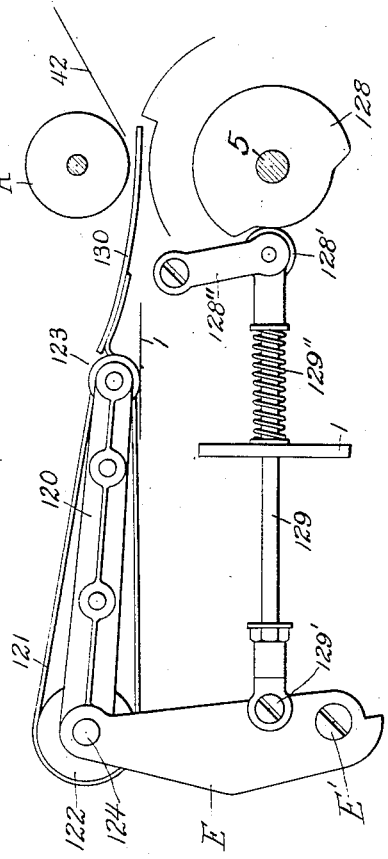
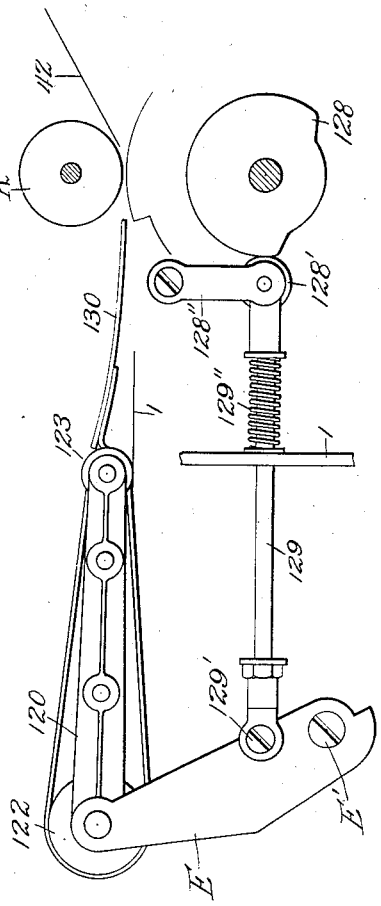
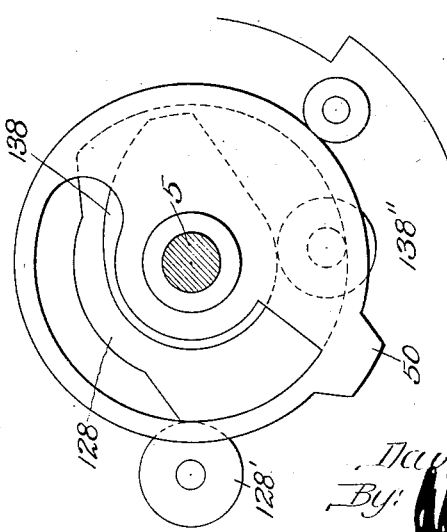
Witnesses:
Inventor
Davydd C. Hughes

UNITED STATES PATENT OFFICE.

DAVYDD C. HUGHES, OF CHICAGO, ILLINOIS, ASSIGNOR, BY MESNE ASSIGNMENTS, TO ADDRESSOGRAPH COMPANY, OF CHICAGO, ILLINOIS, A CORPORATION OF ILLINOIS.

MULTIPRINTING AND ADDRESSING MACHINE.

1,198,551.     Specification of Letters Patent.     Patented Sept. 19, 1916.

Application filed October 22, 1910. Serial No. 588,564.

*To all whom it may concern:*

Be it known that I, DAVYDD C. HUGHES, a citizen of the United States, and a resident of Chicago, Cook county, Illinois, have invented certain new and useful Improvements in Multiprinting and Addressing Machines, of which the following is a full, true, clear, and exact description, such as will enable others skilled in the art to which it appertains to make and use the same.

My invention relates to printing and addressing machines and has special reference to machines of the character used for printing letters, circulars, statements and the like.

The object of my invention is to provide a machine of this character which will print letters, circulars, statements and the like in their entirety so that when these articles leave the machine they will be in readiness for the mail without the necessity of any further preparation.

A further object of my invention is to provide a combination letter writing and addressing machine which will write or print the body of a given letter, circular or the like upon each article and which will place a different name and address on each article.

In another aspect my invention has for its object the provision of a combination writing machine which will be especially adapted for use in connection with an addressing system, such as the "Rogers" addressing system, wherein the different addresses or superscriptions are represented by individual address or type plates; which machine will write or print the same main or body portion of a letter, circular and the like on successive pieces of printable material, which will utilize these address plates to apply a different address to each body portion of the article, and which will date the article and apply the proper salutation, the printing of the several portions of each article being preferably accomplished in a single operation.

A further object is to provide a machine, as above outlined, which will produce these articles so that they will have the appearance and characteristics of ordinary typewritten matter and will convey to the addressee the impression of individuality, thereby rendering the article more effective in accomplishing the desired end.

A further object of my invention is to provide a circularizing machine which will be accurately, conveniently and independently adjustable and regulable throughout all of its parts so that the complete article may be printed in one operation or any portion thereof printed independently of the other portions; which will be entirely automatic and extremely economical to maintain, and will be especially adapted for use in an ordinary business office without the necessity for a skilled person, and which will be capable of producing a large quantity of printed articles in a comparatively short time.

Further objects of my invention will appear hereinafter.

Referring to the accompanying drawings, I will describe one embodiment of my invention.

Figure 2:
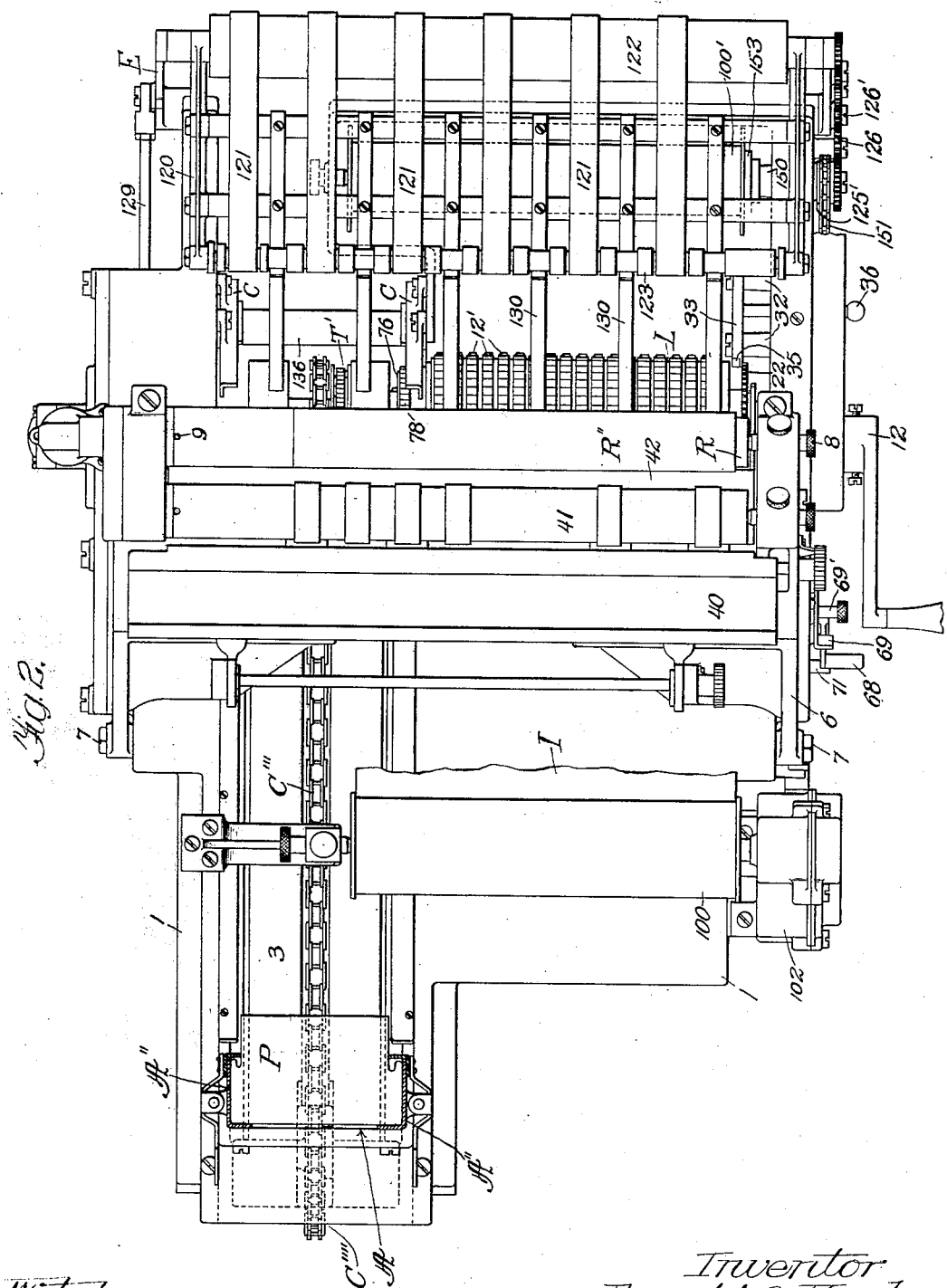
Figure 3:
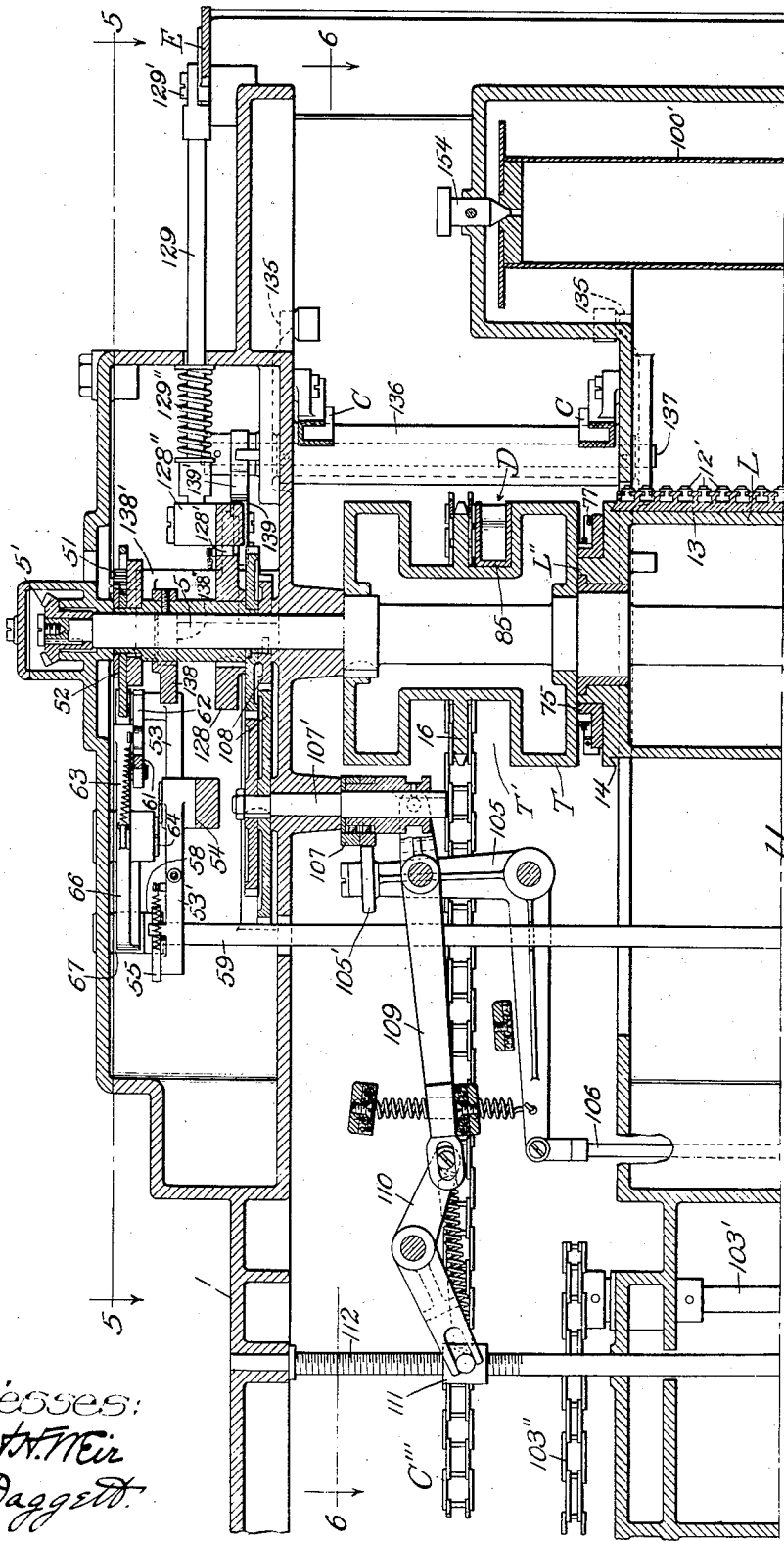
Figure 4:
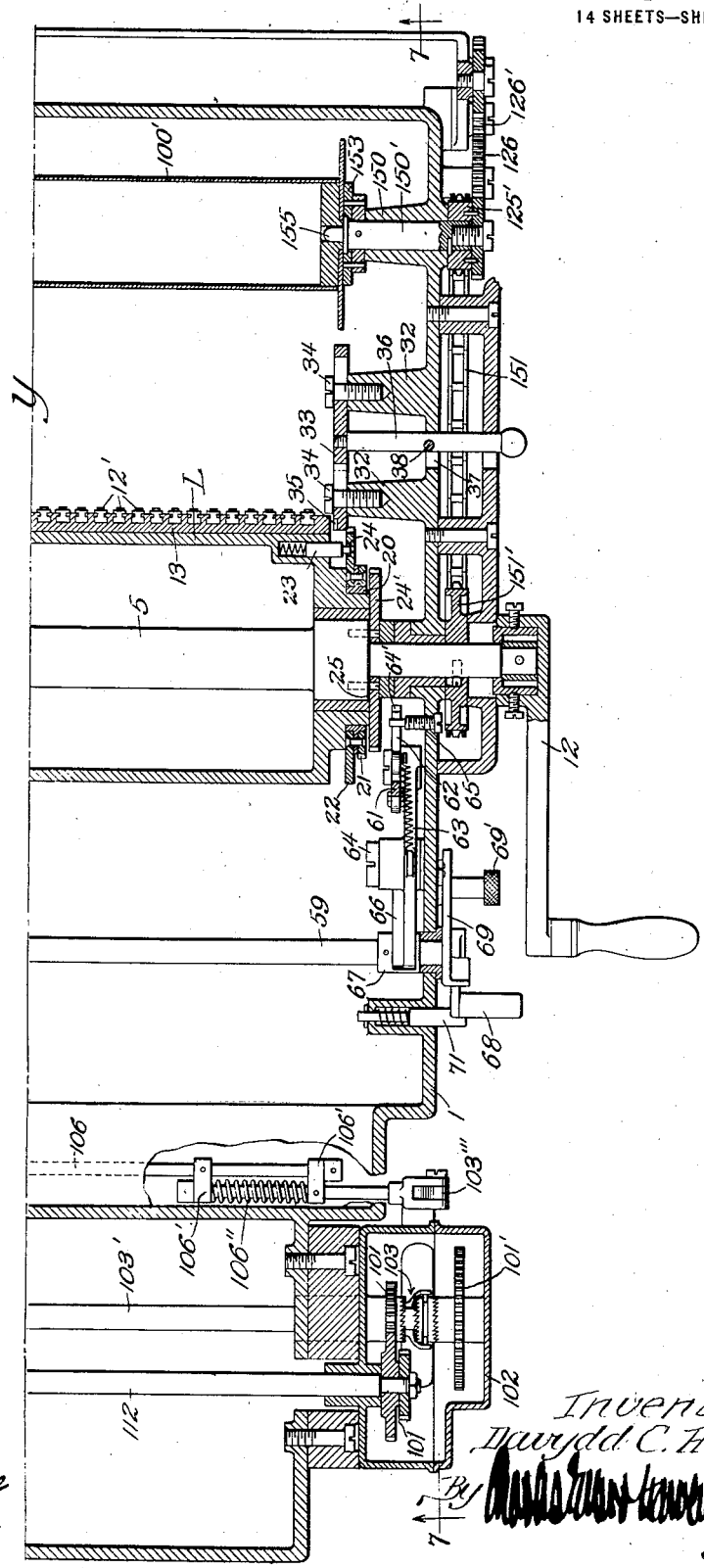
Figure 5:
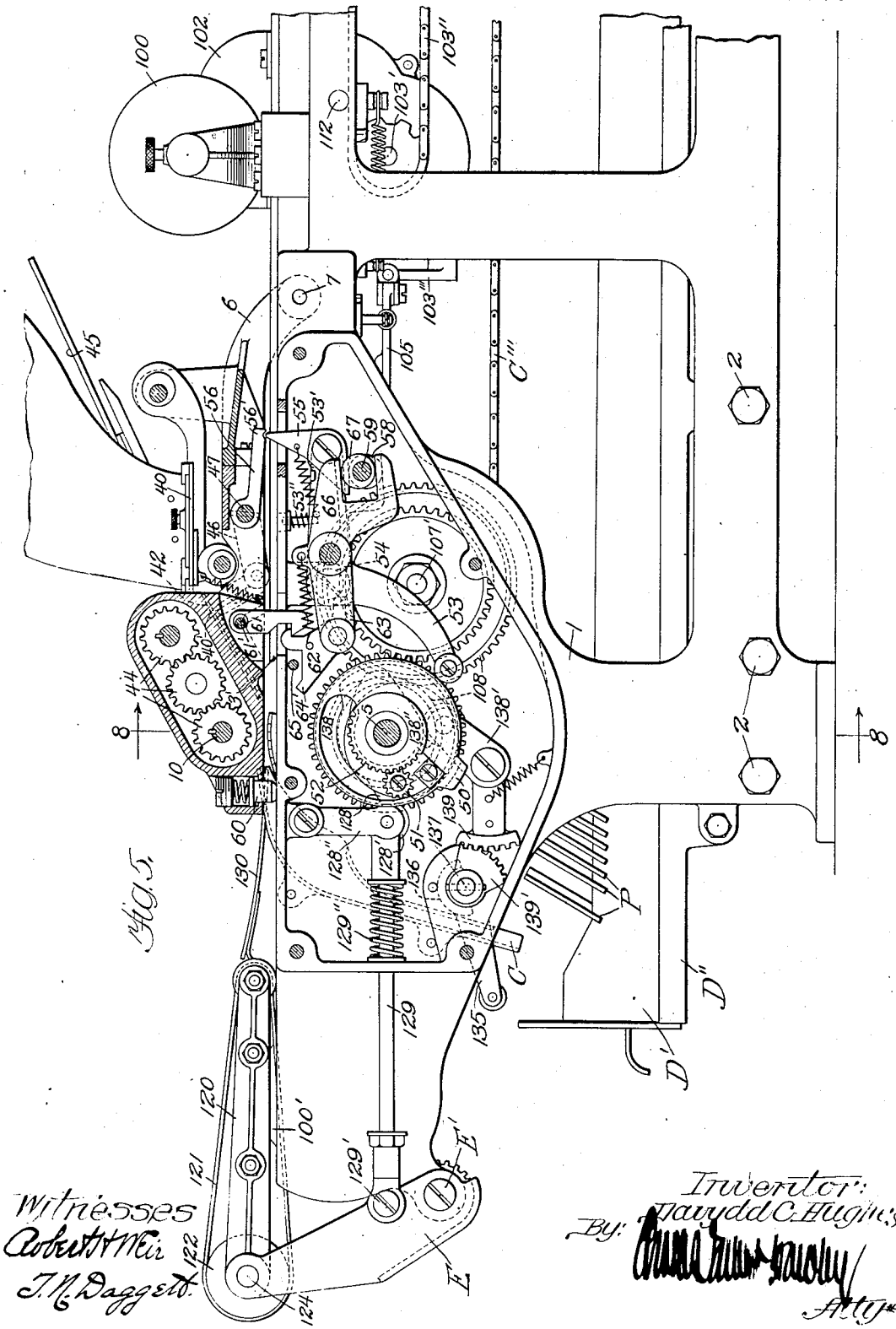
Figure 6:
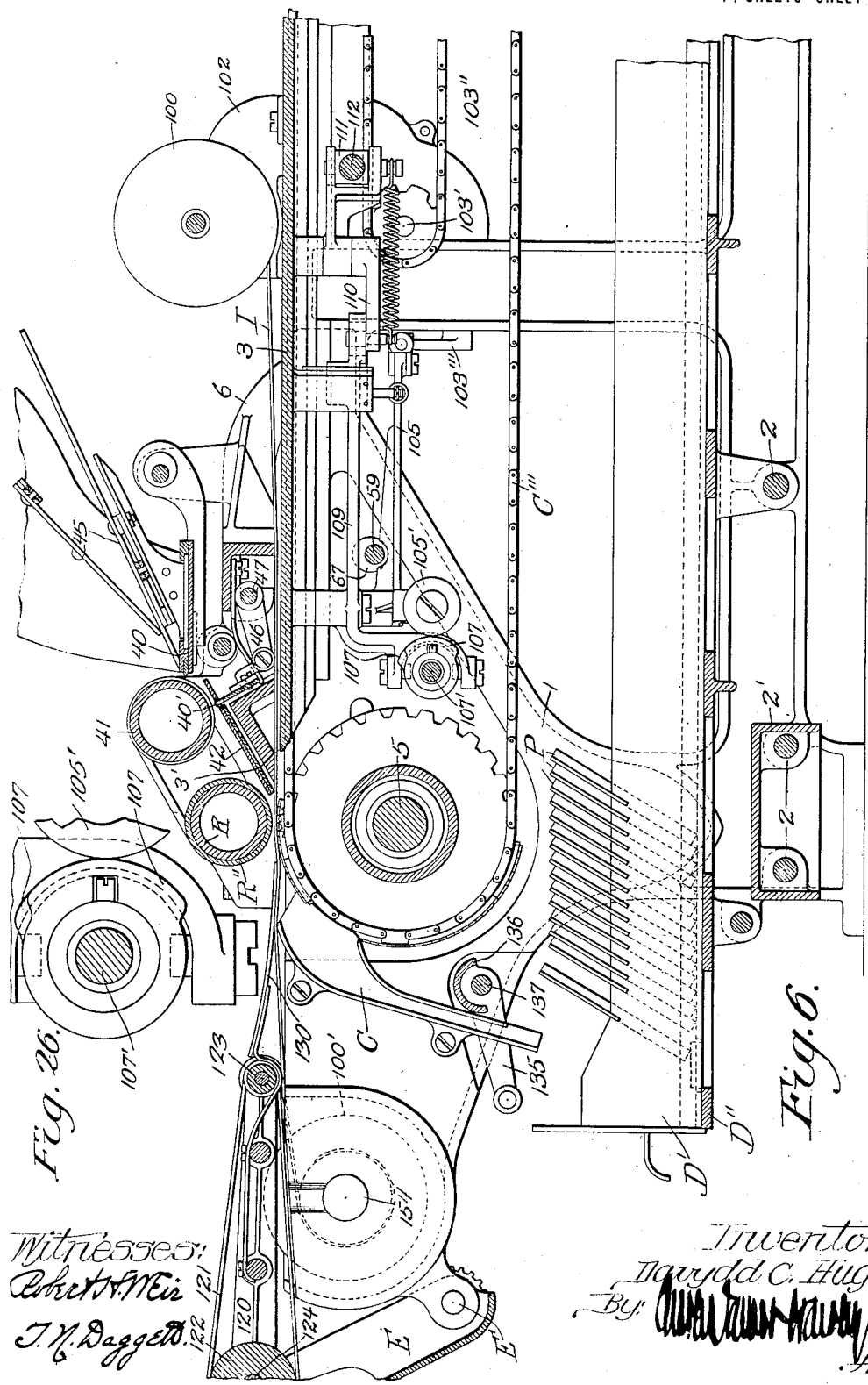
Figure 7:
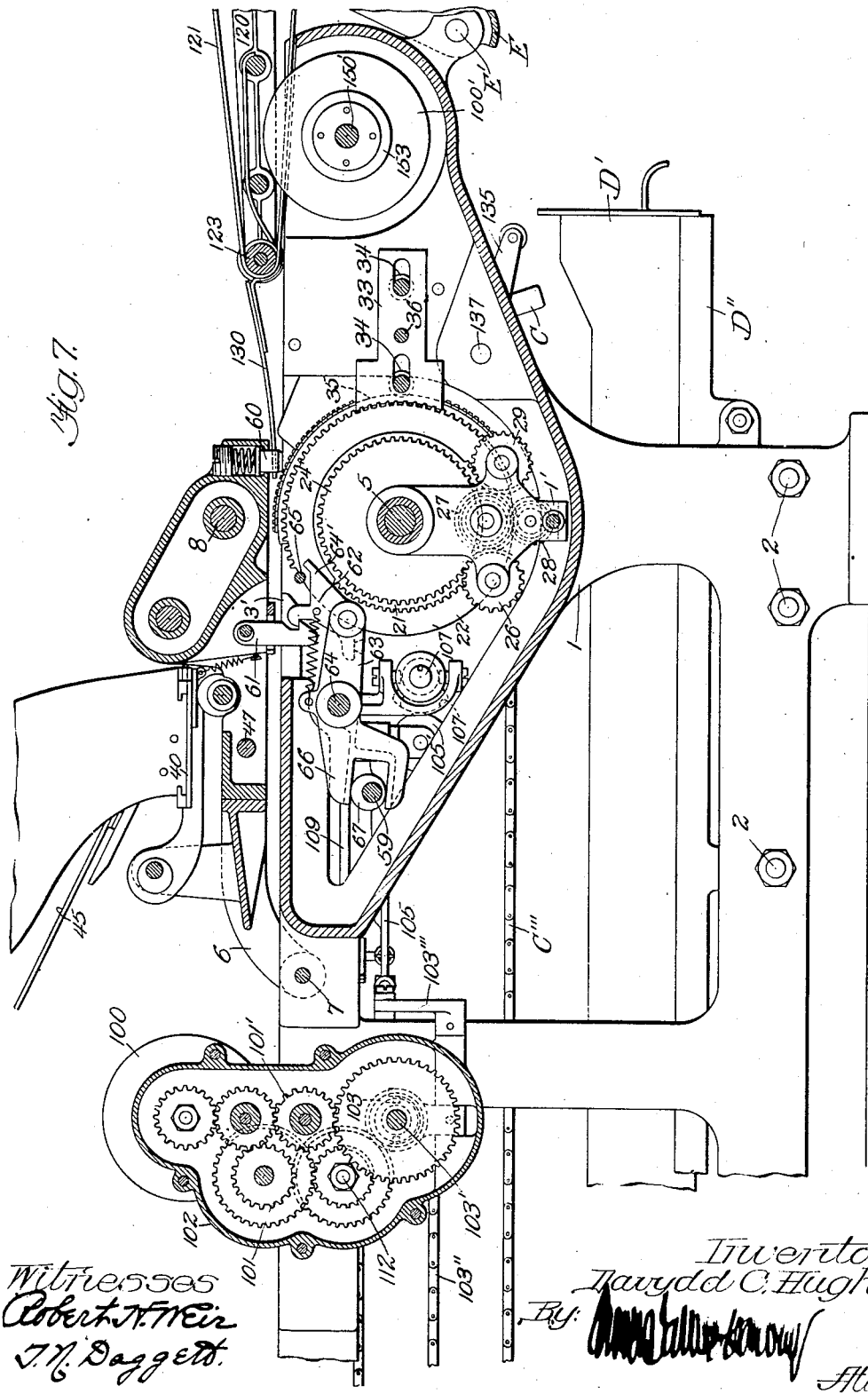
Figure 14:
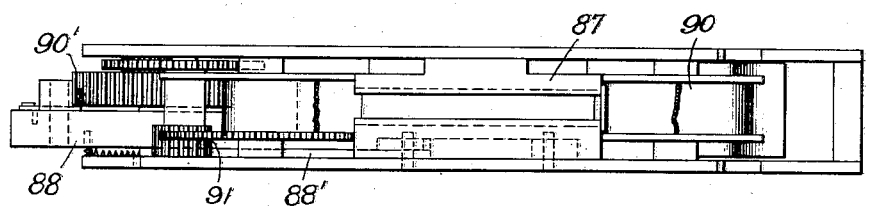
Figure 13:
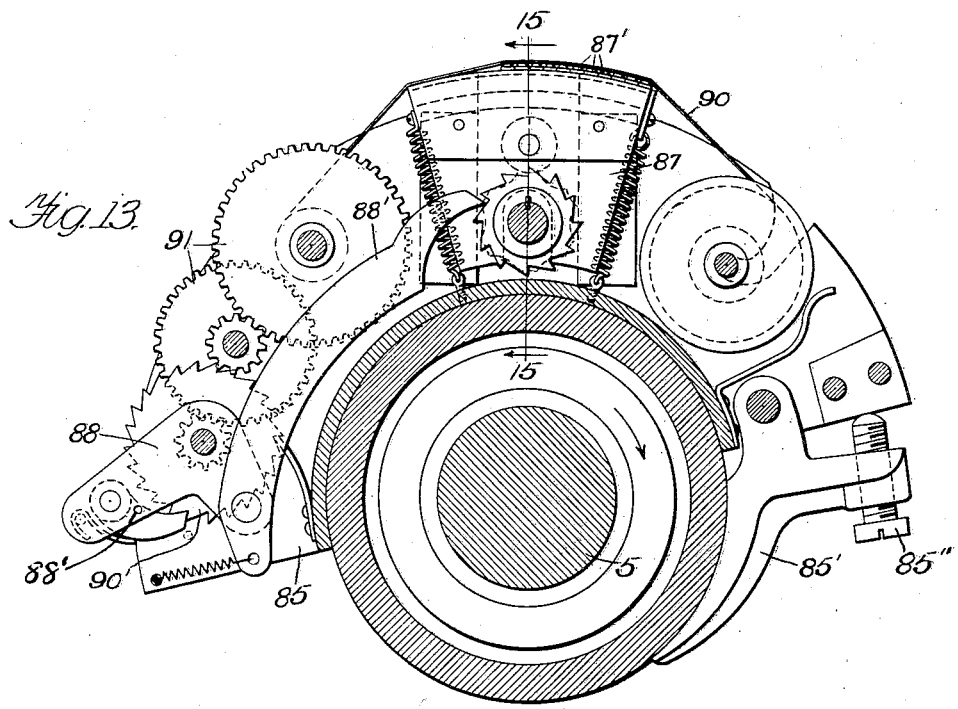
Figure 15:
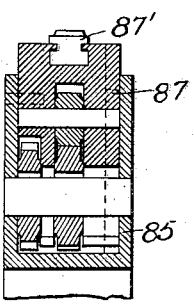
Figure 20:
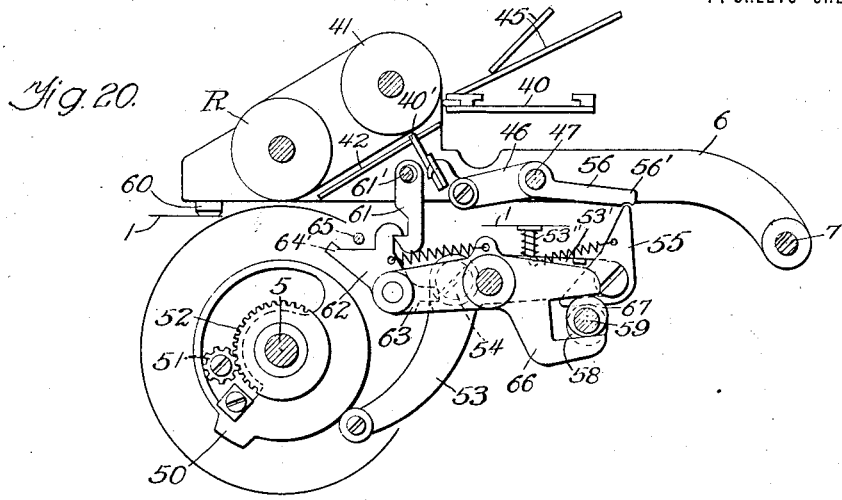
Figure 21:
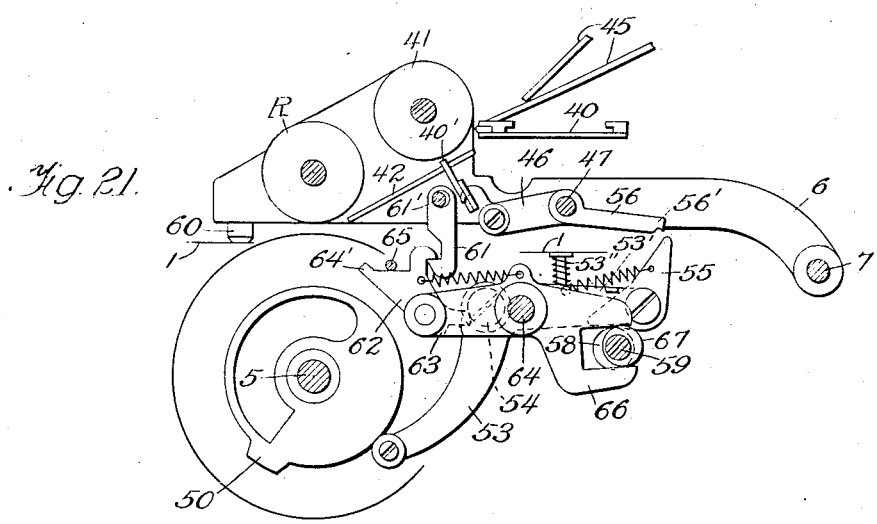
Figure 22:
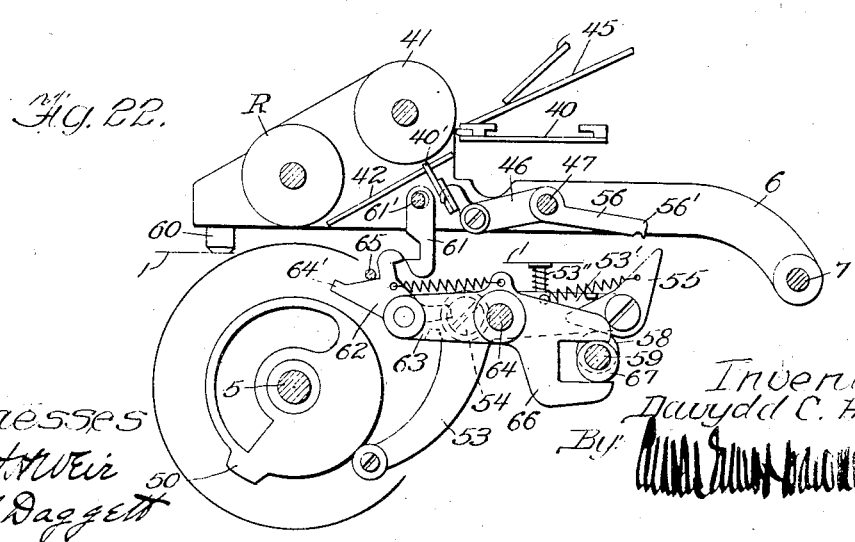

Figure 1 is a side elevation of a printing and addressing machine embodying my invention; Fig. 2 is a top plan view of the machine shown in Fig. 1; Figs. 3 and 4, when taken together, constitute a complete top plan sectional view substantially on line X—X of Fig. 1. These figures meet on the dotted line Y—Y and must be placed together on this line in order that they may be properly read. Fig. 5 is a vertical sectional view, partly in elevation, taken substantially on the line 5—5 of Fig. 3 looking in the direction of the arrows; Fig. 6 is a similar view taken substantially on line 6—6 of Fig. 3 looking in the direction of the arrows; Fig. 7 is a similar view taken substantially on the line 7—7 of Fig. 4; Fig. 8 is a transverse vertical sectional view taken substantially on line 8—8 of Fig. 5 looking toward the rear of the machine; Fig. 9 is an enlarged view of the lower drums of the printing mechanism and shows the dating and salutation mechanisms related thereto; parts of the letter drum being in section to show the formation of the type channels; Figs. 10 and 12 are detail views of the salutation mechanism, Fig. 10 being a sectional view on line 10—10 of Fig. 9, and Fig. 12 being a sectional view on line 12—12 of Fig. 10; Fig. 11 is a sectional view on line 11—11 of Fig. 9; Figs. 13, 14 and 15 are enlarged detail views of the dating mechanism, Fig. 13 being a sectional view on line 13—13 of Fig. 9, Fig. 14 being a top plan view of the dating mechanism shown in Fig. 13, and Fig. 15 being a sectional view on line 15—15 of Fig. 13; Figs. 16 to 19, inclusive, are enlarged detail views of the mechanism which controls the differential relation of the drums of the printing mechanism. Of these views Fig. 16 is a sectional view of the end of the letter drum taken on line 16—16 of Fig. 17; Fig. 17 is a longitudinal sectional view of the end portion of the letter drum on the line 17—17 of Fig. 16; Fig. 18 is a detail view in elevation of the lower portion of Fig. 17; Fig. 19 is a plan sectional view on line 19—19 of Fig. 16; Figs. 20, 21 and 22 are diagrammatic views illustrative of the operation of the paper controlling mechanism, and of the means for regulating the pressure in the printing mechanism and for releasing the carriage; Fig. 23 is a diagrammatic view illustrating the relation of the various actuating and timing cams; Figs. 24 and 25 are likewise diagrammatic views illustrating the operation of the paper delivery mechanism, with relation to the printing mechanism; and Fig. 26 is an enlarged detail of the cams 107, as shown in Fig. 6.

The drawings depict a machine embodying my invention and which I have found best adapted to the various requirements in printing or producing letters, circulars, statements or the like, but it will be understood that my invention is capable of embodiment in other structures adapted for other conditions. This machine comprises various parts and mechanisms arranged in an organized operative combination, each of these parts performing its peculiar function in a definite co-acting relation to the other parts and to the machine as a whole.

For the purpose of a complete understanding of my invention I will describe the nature and functions, together with the details, of the various parts and operating mechanisms as organized into the complete combination, in the following order: the frame, the printing mechanism, the salutation mechanism, the dating mechanism, the paper feeder, the inking mechanism, the paper delivery mechanism, the plate magazine and conveyer mechanism, the plate receiver and packing mechanism.

*The frame.*—All of the parts and mechanisms are mounted in a suitable frame which maintains them in their proper operative relation with respect to each other. This frame consists mainly of two side members 1, rigidly held together at the bottom by the bolts 2 and spacer beams 2'. This frame is made skeleton in form so that the machine will be as light in weight as possible consistent with rigidity and strength. It has various extensions for the purpose of accommodating the different mechanisms, and, wherever possible, these extensions are formed as casings or housings to protect the mechanisms from damage and prevent the entrance of grit and dirt and at the same time present a neat appearing, substantial structure. A plate 3 extends substantially the length of the upper portion of the frame and serves not only as a rigid brace for the side members 1, but as a guide for the address or type plates P (Fig. 6). The guide plate extends forward from the address plate magazine A. Its forward end 3' terminates adjacent the printing mechanism. The address plates leave this terminal end and pass directly into the printing mechanism.

*The printing mechanism.*—One of the objects of my invention, as before stated, is to provide a machine which prints all of the parts or elements of a letter or other article in the same operation. It is desirable therefore to have a printing mechanism which will be capable of performing the several printing functions in as convenient, accurate and reliable a manner as possible. As will hereinafter appear, the printing mechanism may take various forms without departing from the scope of my invention. For general work, however, of the character done by these machines, I find that a printing mechanism of the rotary type is the best suited to the purpose. The usual letter, circular, statement or such articles consist principally of four elements, namely, the body or main portion of the communication, the address or superscription, the salutation corresponding to the person to whom it is addressed, and the date. The body portion usually is the same in each letter or other article, but the other elements, particularly the address or superscription, and the salutation are variable factors, that is to say, each article has the same body portion but a different salutation and address. In the present machine I prefer to utilize the individual address plates P for applying the different addresses to the articles, and I find that a rotary printing mechanism is best suited to this purpose. The reason that I prefer to utilize independent address plates has its basis in the fact that the address plates usually constitute a component part of an addressing system in a business office. These plates are usually contained in the drawers of the filing cabinet in the manner of a card index. They may be placed in the machine for use in printing the different addresses and after the printing operation they may be returned to their original condition in the drawer ready for future use. Thus the machine may be adapted to existing addressing systems and particularly to the so-called "Rogers" system. Another reason is that it is often desirable, for instance, to print the addresses on envelops and not in conjunction with letters or circulars. If the addresses were permanently associated with the printing mechanism it is readily seen that the addresses alone could not be printed with any degree of practicability.

Returning again to the printing mechanism, I construct my machine in such a manner that independent address plates may be employed therein, and I construct the printing mechanism in such a manner that it will press the different plates upon the articles simultaneously with the printing of the other elements of the articles.

Referring now more particularly to Figs. 3, 4, 8 and 9, it will be seen that the printing mechanism consists of two co-axial lower drums L and T, and a co-acting upper pressure roll R common to and as long as both the lower drums. The lower drums are mounted upon a shaft 5 which is journaled in suitable bearings in the frame. A crank handle 12 is provided upon the end of shaft 5 for operating the machine. The drum L, for convenience, I term the "letter drum," for the reason that its function is to print the main or body portion of the article. Similarly the drum T I term the "plate drum" because it is associated and co-acts with the address plates. The pressure roll R is smaller in diameter than the drums. It has a rubber or composition platen surface R'' so as not to injure the type. I prefer to mount the pressure roll in a swinging or auxiliary carriage 6 which is pivoted at 7 to the sides of the frame, the reason for this being that it permits the carriage to be swung upwardly, and the roll and drums thereby widely separated so access may be gained to the mechanisms below the carriage, and for making various adjustments, as will hereinafter be described.

The pressure roll is removable from the carriage without disturbing its adjustment, one end thereof being centered by a removable pin 8 while the other end has a separable connection 9 with its driving shaft 10 journaled in the carriage. The shafts 5 and 10 are connected by two sets of bevel gears 5' and 10', as clearly shown in Fig. 8. A separable dental clutch 11 is interposed in the shaft between the two sets of gears so as to permit the carriage to be raised, this clutch being located, as clearly seen, substantially on the dividing line between the upper portion of the framework and the carriage. These gears are so proportioned that the peripheral speed of the roll and that of the printing faces of the lower drums will be identically the same so as not to smudge or blur the impression on the paper.

The reason I provide the two drums L and T is this: The body of a letter or circular usually remains the same for each of a number of articles, but the address and salutation are necessarily different for each article. By arranging the two drums independent of each other I am enabled to set up the body or main part of the letter on the drum L and as many sheets of paper as desired may be printed therefrom while the drum T carries the plates through the printing mechanism in proper time.

It is readily seen that the type representing the body portion of the article to be printed could not be conveniently set up in composition directly on the drum L, hence I provide a separable type holder or chase which may be removed from the printing mechanism for the purpose of composing the type and afterward placed in position on the drum. As clearly shown in Figs. 9 and 11 this chase consists of a thin curved plate 13 conformed to the curvature of the periphery of the drum and embracing substantially half the circumference of the drum. The inner end of this curved plate is formed to fit an under-cut shoulder 14 on the inner end of the drum to prevent the chase from becoming displaced. The other end of the plate is secured to the drum by means of screws 15. This construction has the advantage that the chase may be adjusted circumferentially of the drum to any position desired. The face of this chase has a plurality of parallel dove-tailed grooves or channels 12'' for the reception of the metal type 12'. It may be stated at this point that on account of the curvature of the chase I find it particularly desirable to employ what is termed "tapered" type. To explain, the abutment faces of the type are disposed on lines drawn radially from the center of the drum (Fig. 9) so that the type will properly conform to the periphery of the drum. The side faces of the type have grooves which co-act with the walls of the type channels to lock the type against movement in any direction except longitudinally of the channel. The type are slipped into the channels from one end thereof. The other ends of the channels are blocked by a strip 13'. After the lines of type have been set up in the channels they are locked against longitudinal movement by means of small adjustable blocks or stops 12'''. The function of the drum T is to properly support the address plates in printing position and to press the plates upon the pieces of paper as they pass through the space between the pressure roll and drums. This drum is rotatable independently of the letter drum. It has a comparatively broad, deep groove T' for the reception of the dating mechanism D which is described later. The space above the peripheral surfaces T'' of the plate drum is just sufficient so that when a type plate is in this space the face of its type will be in the printing plane, that is, in line with the face of the letter type.

It is readily seen that the speed of the face of the type on the letter drum and on the type plates must necessarily be exactly the same at the instant of the printing pressure so as not to tear the sheets or blur the impression. The printing face of the type on the letter drum, however, follows a curve corresponding to the circumference of the drum, while the face of the type on the type plates lies in a straight line at a tangent to the plate drum. Obviously then, in order to equalize the face speed of both sets of type during the printing operation the plate drum being smaller in diameter must be rotated at a trifle greater speed than the letter drum, in order that the peripheral speed thereof may be the same as the peripheral speed of the letter drum. This I accomplish by means of differential gearing located at one end of the letter drum and coacting to bring about a differential speed relation between the two drums during the printing operation, as hereinafter described.

In printing machines of this character, the question of size becomes a very important consideration since the machines are principally used in ordinary business offices or commercial houses. Manifestly then any structural design which reduces the size of the machine to the smallest possible dimensions, consistent with its proper operation, is very desirable. For this important reason I make the plate and letter drums comparatively small. As clearly seen, I can so arrange the letter drum that it will print an impression at each revolution without any particular regard for its size. With a small plate drum, however, it is not advisable to print at each revolution since the wear and tear on the machine and plates would be too great. I prefer, therefore, to so proportion the parts with respect to the plate drum that an address plate will be brought forward to the printing mechanism at each second revolution of the plate drum. Thus it is evident that for each printing operation the plate drum must make two revolutions while the letter drum is making one. I prefer to rotate the plate drum at a constant speed and to vary the speed of the letter drum to suit the conditions just described. For this reason I connect the plate drum direct to the shaft 5 so that it may be driven directly from the crank handle. The letter drum is rotatable on this shaft and I provide a suitable differential gear mechanism to bring about the variations in the speed of the letter drum.

Referring now more particularly to Figs. 7 and 16 to 19 inclusive, I will describe the mechanism for bringing about this differential speed relation between the two drums. The drum, L, as will be seen, is freely rotatable on the shaft 5. The drum L carries on its end two mutilated gears 21 and 22 of different diameters. These gears are pinned to a flanged ring 20 which is freely rotatable on the shouldered end of the drum. The drum receives its rotary movement from the mutilated gears through the medium of a spring pressed pin 23 (Fig. 17) the end of which enters the corresponding hole 24 in the face of gear 22. This constitutes the only connection between the drum and gears, the object being to permit the letter drum to be disconnected when desired, as will be later described. A large spur gear 24' is secured to a shoulder 25 formed by an enlarged portion of the shaft 5 and partakes of the constant speed of the shaft. This gear transmits motion to the mutilated gears and thence to the drum through the medium of several double pinions rotatably mounted upon suitable shafts carried in a U-shaped depending portion 1' of the machine frame. In Fig. 16 it will be seen that the spur gear 24' meshes with and drives a double pinion 26 which in turn drives a double pinion 27. The members of the double pinion 27, drive two other double pinions 28 and 29 which in turn mesh with and drive the mutilated gears 22 and 21 respectively. The mutilated gear 21 and its corresponding pinion 29 are so proportioned that they rotate the letter drum at the printing speed, this being a trifle slower than the speed of the plate drum for the purpose of equalizing the face speed of the type, as before referred to. The mutilated gear 22 and its corresponding pinion 28 are so proportioned that the letter drum L is rotated at a much slower speed after each printing operation in order to permit the plate drum to complete the revolution and make another revolution. Hence by the time the plate drum completes its two revolutions the next address plate will arrive at the printing position in time for the next printing operation. The former differential speed relation exists during the printing operation, while the latter exists in the interval between printing operations. Figs. 16 to 19, inclusive, clearly show the several trains of gears for accomplishing these differential speed relations. The drums rotate in the direction of the arrow (Fig. 16) and the printing speed begins at point 30 on gear 21. From this point the movements of the drums can be easily traced.

It frequently happens that it is desired to print only the address as in the case of addressing envelops. This condition renders it undesirable or in fact unnecessary to use the letter drum. For this reason I provide means by which the letter drum may be disconnected from the driving mechanism and allowed to remain idle. Referring to Figs. 4 and 7 it will be seen that the machine frame has two instanding bosses, 32, adjacent the end of the letter drum. On the ends of these bosses I mount a slotted plate, 33, which is guided by the screws 34 so as to slide radially toward and from the end of the letter drum. This plate is adapted to be projected into the path of the spring pressed pin, 23. It is provided with a curved cam surface 35. When the end of this plate is projected into the path of the pin it becomes interposed between the pin and the mutilated gear 22 due to the fact that the pin rides upon the cam surface 35, and it is thereby withdrawn from connection with said gear, thus completely disconnecting the drum from its driving mechanism. The sliding plate is operated by means of an arm, 36, which projects through a slot, 37, in the frame. The plate is held in either of its positions by a spring pressed pin, 38, (shown in dotted lines in Fig. 1), which locks the arm in either end of the slot, 37.

*Salutation mechanism.*—The salutation such as "Dear Sir," "Dear Madame," "Gentlemen," constitutes one element or part of the complete make up of a letter or similar article, but, of course, this is variable, depending upon the person or party to whom the article is addressed. It is possible to simply set up type in the chase of the letter drum for this purpose, but the impracticability of this method is at once apparent since it would be necessary to remove the chase and change the salutation each time it is necessary to print a different salutation.

I prefer to provide a salutation mechanism in association with the printing mechanism. It is preferably rotary in character and independent of the printing mechanism so that it may be adjusted with respect to the printing mechanism. It preferably carries a plurality of salutations so that any desired salutation may be conveniently placed in printing position.

The salutation is usually located on the printed article between the address and the first line of the letter. In my preferred construction, this mechanism comprises a ring or annulus 75, and a plurality of radially disposed type holders 76 carried thereon. This mechanism is located in a space provided for it between the two drums. For this purpose the end L″ of the letter drum is reduced in diameter. This reduced portion is eccentrically arranged with respect to the axis of the drum. The salutation mechanism is independently rotatable on this eccentric portion. As clearly shown in Fig. 10, each of these type holders has a type channel or groove, 77, in its outer edge, in which a line of tapered type, 78, representing a salutation is placed. I prefer to arrange these so each one of these type holders carries a different salutation. It is obvious, however, that the face of the type in all of these type holders cannot be in the printing plane at the same time for the reason that, as the drum rotates, each salutation would be printed on the paper. I, therefore, make the salutation mechanism of less diameter than the diameter of the printing face of the type on the drums. Due to the eccentric portion L″ of the drum, however, any one of the salutations may be brought into the printing position by simply rotating the ring until the desired salutation is on the high part of the eccentric portion L″, as clearly shown in Fig. 10. This high part is preferably arranged with respect to the type on the letter drum so that the salutation is printed at the left hand side of and with substantially the same margin as the body of the letter, this being the conventional form. It is to be understood, however, that the letter drum may be constructed so that the highest part of the portion L″ comes to any position with respect to the body of the letter. The dotted line 79 indicates the printing plane of the face of the type on the letter drum and makes clear the fact that only one of the type holders has its type in the printing position at one time. It will be noted, however, that the face of the type in each individual holder lies in an arc the radius of which is the same as that of the arc in which the face of the type on the letter drum lies. This insures a uniform printing of the whole line of salutation type.

Due to the inaccuracies in manufacture or wear of the parts it would be possible for one end of the salutation to drop below or rise above the printing plane, therefore causing it to print lighter or heavier than the rest of the salutation. To guard against this I make each individual holder radially adjustable on the ring 75. Each holder has a flanged base conformed to the curvature of the ring and at each end of this flange is a screw 76′ which acts against the ring 75. By turning these screws the ends of the salutation may be raised or lowered with respect to the letter type. In addition to this I provide two screws 76″ which extend through the flange of the holder and screw into the ring 75 for the purpose of clamping the holder in its adjusted position.

As I have previously stated, the salutation ring is freely rotatable on the eccentric portion of the letter drum. In order to hold the salutation mechanism against rotation I provide an automatic lock which acts to lock whichever salutation is in printing position. This lock consists of a small spring pressed pin 80 set in the end face of the drum at a point corresponding to the printing position. In the adjacent face of each of the type holders I provide a cam shaped slot 81 for the reception of the pin 80. These slots are so formed that they provide abrupt shoulders to the pin and positively prevent the salutation from shifting in one direction, but permit the free movement thereof in the other direction. In other words, the salutation ring is positively locked against movement in the direction in which it tends to lag. In the other direction, however, the spring lock acts as a ratchet in the slots and permits the ring to be easily adjusted to bring the proper salutation into place.

*Dating mechanism.*—The date of a letter or like article is subject to change frequently. The date, however, is usually positioned on the paper above or in the line with the address and adjacent the right hand margin, but it is often placed at the bottom of the article. I have provided a mechanism of a rotary character associated with the printing mechanism in such manner that the date will be applied simultaneously with the other parts of the letter. I prefer to relate the dating mechanism to the plate drum, but obviously it may be associated with other parts of the machine if found desirable. For the purpose of accommodating the dating mechanism a major portion of the plate drum, as before stated, has a groove T' (Fig. 8) so that the dating mechanism lies principally within the periphery of the drum and hence below the printing plane or level, as more clearly shown in Figs. 8, 9, 13, 14 and 15. The dating mechanism may be arranged as a permanent part of the machine, but I prefer to make it in the nature of a self-contained structure attachable or detachable, as a whole, from the plate drum. For this reason I provide an arc-shaped carrier or frame, 85, which embraces substantially half of the bottom wall of the groove T' and upon this carrier I mount the other parts necessary to properly print the date upon the paper. This method of arranging the dating mechanism permits it to be adjusted circumferentially of the drum so that the date may be applied in any position on the article. The carrier is removably clamped on the drum by means of a pivoted toe 85', which is operated by the screw 85" (Fig. 13). The carrier contains a type holder 87 which is radially movable to and from the printing position. The type 87' are carried in a type channel on the curved edge of the holder. It will be remembered, as before stated, that the plate drum makes two revolutions per impression, and during the idle rotation of this drum it is not desirable to have the dating mechanism in position to print. This is my object in making the type holder movable. For the purpose of shifting or moving the type holder I have provided a pivoted bell-crank lever 88, which projects beyond the surface of the drum and strikes the pressure roll during each revolution. This bell-crank lever actuates a cam, through the medium of a long pawl 88' to alternately raise and lower the type holder. The printing mechanism rotates in the direction of the arrow (Fig. 13) hence the type holder is actuated in advance of its arrival at the printing position. In the usual letter the address begins at the left hand margin of the sheet while the date is printed near the right hand margin of the sheet. The dating mechanism is arranged so that it will lag behind the printing of the address. Hence it is apparent that even though the dating mechanism is mounted on the plate drum it is not interfered with by the plates since they pass over the drum and out of the way before the dating mechanism comes into action.

I could, if desired, make the main inking ribbon "I" wide enough to overlap the dating type and supply ink thereto. I prefer, however, to provide a separate inking ribbon individual to the dating mechanism for the reason that it is often desirable to run articles through the machine and simply apply the date thereto, and it would be uneconomical and expensive to use the main ribbon for this purpose. Furthermore, as is later explained, the main ribbon might happen to be moving in the wrong direction at the time the date is applied, and in consequence the impression would be blurred and perhaps the ribbon torn. This individual ribbon 90 is wound upon reels disposed one at each side of the type holder and is stretched across the face of the dating type. One of these reels is driven from the striking mechanism 88 through the medium of a ratchet 90', and a train of gears 91, so that the ribbon will present a different surface for each impression. It is sometimes desirable to dispense with the dating mechanism without removing it from the drum. By simply locking the bell crank 88 within the carrier, by means of a pin extending through an opening in the carrier and into the opening $88^2$, so that it does not project beyond the surface of the drum it will not be effective to actuate the dating mechanism and renders it unnecessary to remove the dating mechanism from the drum.

*Paper feeder.*—In a machine of this character it is necessary that the paper or other articles to be printed should be fed to the printing mechanism in a proper time relation to the printing mechanism and to the type plates so that the imprint will be properly placed on the article. This is the function of the paper feeder. It is more clearly shown in Figs. 5, 6 and 7 and the diagrammatic views 20, 21 and 22, these being referred to later. The feeding mechanism is located on the auxiliary carriage 6, at the intake side of the printing mechanism. It comprises essentially a paper receiving ledge or bar 40, a feeding or drawing roll 41 which withdraws the articles one by one from the ledge or bar 40 and passes them downward along a guide plate 42 (Fig. 6), and a set of stopping and releasing dogs 40' coöperating with the feed roll. These dogs control the feeding of the article to the printing mechanism in a definite time relation thereto. The feed roll 41 resembles the pressure roll with the exception that it has a plurality of frictional drawing bands for frictionally engaging the paper. It is driven in unison with the pressure roll through the medium of a train of gears 44 (Fig. 5) and at the same speed. Like the pressure roll it is removable and replaceable on the carriage, without disturbing its adjustment, similar to the pressure roll R. An extensible and collapsible paper holder is provided. This has inclined double floors 45 upon which a pack of paper or envelops or other articles to be printed may be placed on edge. Due to the inclined floors the pack settles down on the ledge close to the feed roll. The edge of the feed ledge 40 lies adjacent to the roll and has restraining or retarding devices which permit the roll to frictionally withdraw the "first" sheets of paper one after the other and pass them downward along the guide plate 42 to the printing mechanism. The dogs, however, are normally interposed in the path of the paper and stop and retain each sheet until the printing mechanism is ready to receive it. At this instant the dogs retract and permit the sheet to pass on downward to the printing mechanism in time to meet the type plate. As clearly shown, these dogs project through openings in the guide plate 42, and are formed on the edge of a long strip. This strip is mounted to slide substantially radially to and from the feed roll at stated periods. The dogs are operated through the medium of arms 46 which are carried upon a shaft 47, journaled in the carriage 6. I have shown herein an improved mechanism for controlling the periods of action and inaction of the dogs. This is depicted in a diagrammatic manner in Figs. 20, 21 and 22, so that it may be clearly understood. Referring more particularly to Fig. 20 it will be seen that the shaft 5 carries a cam 50. This cam actuates the dogs through an intermediate system of levers and is rotatably adjustable on the shaft for the purpose of timing the dogs. The adjustment is accomplished by means of a small pinion 51 meshing with a mutilated gear 52 carried by the cam. The cam, 50, co-acts with the rollered end of one arm 53 of a bell crank lever pivoted at 54 on the main frame. The other arm 53' of this bell crank carries a pivoted spring pressed detent 55 which engages with the notched end 56' of an arm 56 secured to the shaft 47. The arm 53 of the bell crank is normally maintained in the path of the cam by a spring 53'' acting on the arm 53'. It will thus be seen that each time the cam actuates the bell crank arm 53 the dogs are withdrawn from the path of the paper and permit the sheet to pass on to the printing mechanism.

Occasions arise when it is desired to skip one or more imprints during the operation of the machine. A simple way to do this is to restrain the action of the dogs. Referring to Fig. 21, I provide a small cam 58, on a shaft 59 which is journaled in the main frame, and which is manipulated by a crank 68 on the outside of the frame. (Figs. 1 and 4). This cam actuates the detent 55 to throw the upper end thereof out of engagement with the arm 56, so that when the time cam 50 actuates the bell crank lever, motion will not be transmitted to the dogs.

In order to prevent the type from printing directly on the pressure roll when an imprint is skipped, I provide mechanism for relieving the pressure by raising the pressure roll. This mechanism also enables me to regulate the pressure during printing operations, as is pointed out later. The forward end of the carriage 6 rests upon the sides of the main frame, the points of support being two adjustable spring pressed bearings 60, which normally tend to separate the pressure roll from the drums of the printing mechanism. The carriage, however, is locked down in position by means of hooks 61 which are engaged by triggers 62. These locks are located at both sides of the carriage frame and hold the carriage down against the action of the spring pressed bearings 60. These triggers are peculiarly formed. They are pivotally mounted upon the arms 63 of two levers. These levers 63 are loosely mounted on stud shafts 64 extended inwardly from the frame members 1. Each of the levers 63 has an oppositely disposed arm 66 which embraces corresponding cams 67 on shaft 59. By turning the crank handle 68 the levers 63 may be rocked and the carriage will rise under the influence of its spring pressed bearings 60 and thereby relieve the pressure. This is preferably done simultaneously with the throwing out of the detent 55. This condition is indicated clearly in Fig. 21. Here it will be seen that the pressure roll is separated from the roller drums sufficient to relieve the pressure in the printing mechanism.

This mechanism which I have just described has another function. It is arranged to unlock and release the carriage so that the carriage may be swung upwardly and the parts of the printing mechanism separated. It will be seen that the triggers 62 have extensions 64'. The extension on one of the triggers engaged with a stop screw 65, screwed into the side of the frame (Figs. 3 and 4). This stop screw trips the triggers and unlocks the carriage as clearly shown in Fig. 22. The stop, however, is positioned so that the trigger has a certain amount of movement previous to being tripped, the object of this being to allow for the regulation of the pressure heretofore described. I provide a spring projected pin 71 in the side of the casing (Fig. 4) against which the crank may be thrown without fear of releasing the carriage. However, if this stop is pressed in and the crank thrown past it the triggers will be tripped and the carriage may be released, as described. For the purpose of maintaining a given pressure in the printing mechanism, once it has been adjusted, I provide a pivoted stop plate 69 (Figs. 1 and 4) which has an up-turned lip lying in the path of the crank 68. This may be fixed in its adjusted position by means of the clamp screw 69'. It will thus be seen that by this arrangement the pressure in the printing mechanism may be adjusted by positioning the stop plate to limit the movement of the crank. Once this adjustment is fixed the crank may be operated to skip impressions or to release the carriage as often as desired. Returning again to Figs. 20, 21 and 22 it will be seen that the locking hooks 61 are eccentrically pivoted at 61' upon the carriage frame, the hooks on each side of the frame being independently adjustable in this manner. The reason for this is to permit the accurate adjustment of one end of the printing mechanism independently of the other so as to equalize the pressure throughout the whole printing arrangement, and thereby secure a uniformly shaded impression on the paper.

*Inking mechanism.*—It will be remembered that one of the objects of my invention is to provide a machine which produces printed articles so that they resemble in appearance and characteristics the work done by an ordinary typewriting machine. The type which I prefer to use in my machine are metallic, and so far as their printing faces are concerned they are identical to the type of an ordinary typewriter. By printing through an inked ribbon or fabric I am enabled to obtain the "ribbon effect" which is characteristic of typewritten impressions. In my present invention I employ a ribbon "I" which is stretched through the printing mechanism and interposed between the face of the type and the paper on which the impression is made. Fig. 8 shows this very clearly. The ribbon "I" is between the face of the type 12' in letter drum and the sheet of paper "S". It will be noted that this ribbon is broad enough to overlap a portion of the address plate drum for the purpose of supplying ink to the type on the address plates. The ribbon is wound upon two reels 100 and 100' on opposite sides of the printing mechanism. These reels I term for convenience the "pay-out" and "take-up" reels respectively. It is apparent that since the ribbon is under compression in the printing mechanism there must necessarily be no relative movement between the face of the type and the paper, otherwise the impression would be blurred and the ribbon torn. This, then, makes it necessary to feed the ribbon during the printing operation in the same direction as the paper moves. I accomplish this by rotating the "pay-out" reel. I prefer, however, to pull back or retract a slightly different length of ribbon after each printing operation so that the ribbon as a whole moves intermittently in one direction. The reciprocating progressive movement is just sufficient to present a relatively new surface of the ribbon to the type for each impression, thereby rendering the impressions clear and distinct. Furthermore it enables me to obtain a large number of impressions from a comparatively short length of ribbon. I also provide reversing mechanism which automatically changes the direction of movement of the ribbon as a whole at the end of a predetermined series of movements so that the ribbon travels slowly in the opposite direction.

For the purpose of actuating the "pay-out" reel in the proper directions to bring about this peculiar movement of the ribbon I employ two trains of gears 101 and 101', suitably journaled in a housing or gear box 102 which is removably secured to the main frame. These gear trains are independent of each other and are thrown into operation by means of a clutch 103 (Fig. 4), this clutch being associated with a shaft 103' which derives its motion from the rear shaft C'' of the conveyer mechanism, through the medium of a sprocket chain 103'', (Figs. 1, 5 and 7). This clutch is actuated at the proper time intervals by cams 107, through the medium of a bell-crank lever 105 and a link 106 (Figs. 3 and 4). These cams are slidably mounted upon a stud shaft 107' journaled in the main frame, and derive their rotary motion from the shaft 5 through a train of intermeshing ratio gears 108. The cams bear definite time relation to the printing mechanism, and are shifted into engagement with the rollered arm 105' of bell-crank 105 by means of a lever 109. This lever is actuated at the end of a series of intermittent movements of the ribbon in either direction by a "snap-over" device 110. The "snap-over" mechanism is actuated by a traveling nut 111 which reciprocates to and fro on a threaded shaft 112. This shaft is associated with the gear trains of the reel mechanism and has a rotary movement which is a counterpart of the reciprocating progressive movement of the ribbon.

The function of the "take-up" reel is to constantly tension the ribbon and take up the slack as the ribbon is paid out from the other reel. In order to perform this function the "take-up" reel has an actuating mechanism associated with it which constantly tends to rotate it in one direction but which permits the ribbon to be pulled back or retracted by the "pay-out" reel, as previously described.

Referring now to Figs. 1, 3 and 4, it will be seen that the forward or "take-up" reel 100' is located in the front end of the frame, this portion of the frame being formed as a housing to protect the ribbon. Instanding from the side of the frame is a boss 150, in which a shaft 150' is journaled. As shown, this shaft has a sprocket 125' on its outer end from which a driving chain 151 extends to a sprocket wheel 151' carried upon the main shaft 5. Obviously then the shaft 150' partakes of the constant speed of the main shaft 5. The inner end of the shaft has a friction plate 153 screwed to it, and this plate frictionally engages with the adjacent face of the end of the reel, so as to provide a driving connection between the reel and its shaft. This friction mechanism is sufficient to rotate the reel when the ribbon is being paid out. It is overcome by the relatively stronger powered gear mechanism of the "pay-out" reel when the ribbon is being retracted. The "take-up" reel is removably held in position at its other end by means of a removable centered pin, 154. The frictionally driven end of the reel is centered by means of a projection 155 on the end of the shaft 150', as shown in Figs. 3 and 4. I have also provided means for permitting the clutch 103 to be operated by hand independently of operating mechanism. In Figs. 3 and 4 it will be seen that the link 106 is divided into two sections. Each section carries a fixed block 106' in which the end of the other section reciprocates. On one of the sections and between the blocks 106' is a spiral spring 106". This, as will be clearly seen, constitutes an elastic connection between the clutch and the mechanism for actuating the clutch. It permits the clutch to be thrown manually by simple pressure upon the rocker arm 103'''. It also serves to absorb the shock incident to the throwing in and out of the clutch.

*The paper delivery mechanism.*—The function of this mechanism is to receive the printed articles from the printing mechanism and to carry them to a point beyond the machine and discharge them in such manner that they may be collected in a suitable receiving tray or basket. It is further intended to separate the printed articles from the plates as they emerge from the printing mechanism. As shown more particularly in Figs. 2, 5, 24 and 25 this mechanism consists of a horizontally operating platform positioned on the front of the machine and arranged parallel to and substantially in the same plane as the space between the roll and drums of the printing mechanism. This platform is pivoted at its outer side to a rocking or oscillating member E mounted on the front end of the machine frame, so as to impart a bodily movement to the platform toward and from the printing mechanism. This platform consists of a flat skeleton frame 120 on the inner and outer edges of which are long rolls 123 and 122 respectively. Running on these rolls are a number of bands or belts 121. These belts are preferably of elastic material so that they will run tight. They run in grooves in the inner roll 123 for the purpose of providing a smooth roll surface. The inner edge or side of this platform simply rests on the frame. The whole platform may be swung upwardly and forwardly about the outer roller shaft 124 as a pivot, thereby permitting access to be gained to the ribbon reel and other mechanism below the platform. The rocking member E is pivoted at E' to the front end of the machine frame.

The belts or bands derive their motion from the mechanism which drives the forward reel of the inking mechanism. As shown in Fig. 1, the forward sprocket 125' of the reel mechanism carries a small pinion which meshes with and drives a similar gear 126. This gear wheel in turn meshes with the lower end gear 126' of a train of gears which extends between the pivotal point E' of the rocking member and the shaft 124 of the roller 122. It will be noted that by arranging the gears in this manner the lower end gear 126' is co-axial with the pivotal point E' of the rocking member, and the rocking member may be swung on its pivot without disturbing the action of the gears.

The mechanism for rocking the member E to move the platform to and from the printing mechanism consists of a cam 128 acting on the rollered end 128' of a reciprocating link or rod 129, this rod being pivotally connected at its other end 129' to the rocking member E at a point somewhat above the pivotal point E'. The rod 129 extends through an opening in the main frame 1. Its rollered end 128' is suspended from the frame 1 by means of a pivotal link 128" (Fig. 5), so as to hold this end in proper relation to the cam and at the same time permit the rod to be oscillated by said cam. The end of this rod is constantly pressed against the cam by means of the spiral spring 129".

As before stated, this platform is adapted to move to and from the printing mechanism to receive the paper. The frame 120 (see Fig. 2) is provided with a plurality of long, slightly grooved, thin fingers or projections 130 which operate to reach into the space between the roll and drums of the printing mechanism and catch the edge of the paper an instant before the printing operation begins. Referring now to Figs. 24 and 25 it will be seen that the cam which actuates this mechanism is timed with relation to the printing mechanism. The fingers move into the space between the roll and drum of the printing mechanism an instant preceding the arrival of the oncoming edge of the type chase on the letter drum and just in time to catch the edge of the paper and separate the paper from the address plate. The fingers then move with the paper out of the space and stop at a point just beyond, but closely adjacent to the periphery of the lower drum, where they remain until the paper completely passes through the printing mechanism. The paper passes on to the belts by which it is delivered over the outer roll. At this point it may be caught in a tray or disposed of in any suitable manner. It will be noticed that the inner ends of the fingers are secured to the bottom of the frame but curve abruptly upward to a point flush with the upper general surface of the belts so as to guide the paper directly on to these belts.

*Address plate magazine and conveyer.*— As is now clearly understood, my present machine employs independent address plates from which to print the different addresses on the articles. It is desirable that means be provided for holding a supply of these plates and for bringing them from the supply to the printing mechanism as they are needed. These are the functions of the magazine A and the plate conveyer. As I have previously stated, the plates are brought forward along the guide plate 3. The magazine A bridges the rear end of this guide. It consists of two side members A″ upstanding from the rear end of the main frame (Figs. 1 and 2) for the purpose of supporting a stack of address plates in such position that the conveyer can extract the lowermost plates in the stack, one by one, and carry them forward to the printing mechanism. The conveyer is preferably of the endless belt type. It consists of an endless chain C‴ carried and running on the forward and rear sprockets. The rear sprocket C″″ is mounted upon the rear shaft C″. The forward sprocket 16 is co-axial with the plate drum. In fact it is integral therewith and divides the groove T′ into two sections into either of which, as before stated, the dating mechanism may be placed. The rear upper portion of the conveyer chain is disposed below the magazine in position to extract the lowermost plates therefrom one by one and carry them along the guide 3 to the printing mechanism. This chain has means spaced at intervals for engaging the lowermost plates in the magazine, these engaging means being spaced on the chain so that a plate will be brought forward with each second revolution of the plate drum, as previously referred to.

*Plate receiver and packer.*—It will be remembered that as the address plates leave the printing mechanism they are discharged into a chute C (Figs. 3, 5 and 6) by which they are directed into the front end of a drawer or receiver D′. As soon as a plate lands in the drawer the packer mechanism comes into operation to push it toward the rear of the drawer so as to keep the front end clear for succeeding plates. This packer mechanism comprises two arms 135 carried upon the ends of a semi-cylindrical sleeve member 136. This manner of mounting the arms keeps them in definite relation to each other. These arms are adapted to swing downwardly outside of the drawer and to engage the side edges of each plate as it falls, and to push the plate rearwardly. The sleeve member 136 is carried upon a shaft 137 journaled in the side members of the said frame. These arms are actuated by a cam 138 carried upon the shaft 5 through the medium of a bell-crank lever 138′. One arm of this bell crank lever carries a friction reducing roller 138″ which lies in the path of said cam. The other arm carries a segmental toothed rack 139 which meshes with a corresponding segmental gear 139′ which is carried by the shaft 137. The time relation of the packer cam 138 is clearly indicated in the diagrammatic view (Fig. 23). It is to be noted that the semi-cylindrical sleeve 136 is positioned immediately in the rear of the chute C and its grooved surface serves in a sense as a guard which prevents the plates from vibrating in the chute or from leaving the chute except at the lower end thereof. The receiver or drawer D′ is carried on a bed plate D″. This bed plate is secured to the frame of the machine. It may be tilted, if desired, to incline the drawer for the purpose of assisting the packers, but I have found this unnecessary.

Now that the nature and functions of my invention are completely understood, it is quite apparent from the foregoing that my invention may be embodied in other structures differing considerably in detail and appearance without departing from the spirit of the invention, and I desire that it be understood accordingly.

I claim:

1. In a printing machine, the combination with a plurality of co-axial drums constituting a printing mechanism and operable independently of each other, means for feeding pieces of paper at timed intervals to said drums, means for feeding independent address plates to one of said drums, and a pressure roll common to and co-acting with said drums for pressing said pieces of paper upon said drums and address plates.

2. In a printing machine, a printing mechanism comprising two independently rotatable co-axial drums, and a pressure roll common thereto and coöperating with said drums, letter printing type on one of said drums, means for feeding independent address plates to the space between said other drum and roll at timed intervals, and means for feeding pieces of paper one at a time through the space between said roll and drums so that said paper simultaneously receives impressions from the address plates and letter type.

3. In a printing machine the combination of an impression cylinder, a cylinder provided on its periphery with printing type, a cylinder adapted to support address plates in coöperative relation with said impression cylinder, means for feeding said plates and paper to be printed to printing position beneath said impression cylinder, a detachable dating mechanism, and a salutation mechanism, said dating and salutation mechanisms being positioned to coöperate with said impression cylinder and all of said parts being arranged to print the body of a letter, the address, the salutation and the date at one operation.

4. In a printing machine the combination of an impression cylinder, means for feeding address plates consecutively to printing position beneath said cylinder, a cylinder provided with type to print the body of the letter, detachable dating mechanism, and salutation mechanism adapted to coöperate with said impression cylinder to print the date and salutation in the same operation in which the body of the letter and the address are printed.

5. In a printing machine a rotary printing mechanism comprising two co-axial independent drums, one of said drums having letter type on its periphery, a co-acting pressure roll for pressing the articles to be printed upon said type, and means for feeding independent address plates to said other drum at timed intervals, said pressure roll being adapted to simultaneously press the same article upon a type plate and the letter type.

6. In a printing machine a rotary printing mechanism comprising two co-axial independent drums, one of said drums having letter type on its periphery, a co-acting pressure roll for pressing the articles to be printed upon said type, means for feeding independent address plates to said other drum at timed intervals, said pressure roll being adapted to simultaneously press the articles upon the type plate and the letter type, and a broad inked ribbon extending through said printing mechanism and intervened between the letter type and the article and between the address plates and the article so that the impressions are made upon said articles through said ribbon.

7. In a printing machine a rotary printing mechanism comprising two co-axial independent drums, one of said drums having letter printing type on its periphery, a co-acting pressure roll for pressing the articles to be printed upon said type, means for feeding independent address plates to said other drum at timed intervals, said pressure roll being adapted to simultaneously press the articles upon type plates during the printing of the article, a broad inked ribbon extending through said printing mechanism and intervened between the letter type and the article and between the address plates and the article so that articles receive the impressions through said ribbon, and a rotary salutation mechanism co-related to said printing mechanism and operating to print the salutation on said articles through said ribbon during the printing of the article.

8. A rotary printing mechanism operable to print letter impressions, comprising a rotary type bed, a rotary type plate bed of smaller diameter than said type bed and arranged to rotate at the same peripheral speed as said type bed during the impression operation, pressing means therefor, a relatively adjustable salutation mechanism having different salutations rotatable with said type bed, and means for locking the desired salutation in printing position.

9. In a printing and addressing machine, the combination with a rotary type bed, of a structurally independent co-axial type plate bed of different diameter mounted to rotate freely and adapted to run during the impression operation at the same peripheral speed as the type bed and pressing means for said beds.

10. In a printing and addressing machine, the combination with a rotary type bed, of a structurally independent co-axial type plate bed of smaller diameter mounted to rotate freely and adapted to run at the same peripheral speed as the type bed during the impression operation, and a platen common to both beds.

11. In a printing and addressing machine, the combination with a rotary type bed, of a structurally independent co-axial freely rotatable type plate bed of smaller diameter, means for driving said type bed, means for rotating the type plate bed during the impression operation and pressing means for said bed.

12. In a printing and addressing machine, the combination with a rotary type bed having type mounted thereon, of a structurally independent co-axial rotary type plate bed of smaller diameter than said type bed and pressing means for said beds, and means for feeding type-carrying forms to said type plate bed, said type plate bed being freely rotatable and adapted to operate at the same peripheral speed as the type bed during the impression operation.

13. In a printing and addressing machine, the combination with a rotary type bed having the type set up thereon, of a structurally independent co-axial type plate bed of smaller diameter than said type bed and arranged to run at the same peripheral speed during the printing operation, a rotary platen for said beds, an inking ribbon interposed between the platen and the beds, means for feeding type plates to the type plate bed, and means for synchronously feeding impression-receiving sheets between the beds and the platen, said ribbon being arranged to move forward between the beds and platen synchronously with the movement of the type plate and paper.

14. In a printing and addressing machine, the combination with a shaft, of a type plate bed mounted thereon to rotate therewith, a type bed of greater diameter than said type plate bed loosely mounted on said shaft, pressing means for said beds, and means for rotating said type plate bed during the impression operation at the same peripheral speed as the type plate bed, and between impression operations at a different speed.

15. In a printing and addressing machine, the combination with a shaft, of a type plate bed mounted thereon to rotate therewith, a type bed of greater diameter than said type plate bed loosely mounted on said shaft, pressing means for said beds and means for rotating said type plate bed during the impression operation at the same peripheral speed as the type plate bed and between impression operations at a slower speed.

16. In a printing and addressing machine, the combination with a rotary type bed, of a structurally independent and co-axial freely rotatable type plate bed of smaller diameter than and arranged to be rotated at the same peripheral speed as the type bed, a platen for said beds, means for delivering type plates to said plate bed, and means for automatically feeding impression-receiving sheets one at a time between said platen and beds.

17. In a printing and addressing machine, the combination with a rotary type bed, of a rotary type plate bed mounted to rotate independently of said type bed, of smaller diameter than said type bed and arranged to be rotated at the same peripheral speed during the impression operation, the difference in diameter of the beds being the thickness of a type plate, a rotary platen for said beds, and means for automatically feeding impression-receiving sheets one at a time between said platen and beds.

18. In a printing and addressing machine, the combination with a rotary type bed, of a structurally independent co-axial freely rotatable type plate bed of smaller diameter than said type bed and arranged to rotate at the same peripheral speed during the impression operation, a platen coöperating with said beds for making an impression, and an inking ribbon interposed between said beds and platen.

19. In a printing and addressing machine, the combination with a rotary type bed, of a structurally independent co-axial rotary type plate bed of smaller diameter, means independent of the type bed for rotating said type plate bed during the impression operation at the same peripheral speed as the type bed, a platen, an inking ribbon interposed between said platen and beds and arranged to move during the printing operation synchronously with the platen and beds.

20. In a printing and addressing machine, the combination with a rotary type bed, of a structurally independent co-axial rotary type plate bed of smaller diameter, means independent of the type bed to move the type plate bed at the same peripheral speed as the type bed during the impression operation, a rotary platen for said beds, and an independently mounted inking ribbon interposed between said platen and beds.

21. In a printing and addressing machine, the combination with a rotary type bed, of a structurally independent co-axial rotary type plate bed of smaller diameter than and arranged to move at the same peripheral speed as the type bed during the impression operation, a platen for said beds, an inking ribbon interposed between the platen and beds, and means for automatically feeding impression-receiving sheets one at a time between the ribbon and the platen.

22. In a printing and addressing machine, the combination with a rotary type bed, of a structurally independent co-axial rotary type plate bed of smaller diameter than and arranged to be moved at the same peripheral speed during the impression operation as the type bed, a rotary platen for said beds, and an inking ribbon interposed between said beds and platen and arranged to have a forward and retractive movement, said forward movement taking place during the impression operation.

23. In a printing and addressing machine, the combination with a letter-printing drum comprising a rotary bed and a type-carrying member removably mounted thereon, of a structurally independent co-axial freely rotatable type plate bed of smaller diameter than the letter-printing drum and arranged to be rotated during the impression operation at the same peripheral speed as the letter-printing drum, and pressing means for said bed and drum.

24. In a printing and addressing machine, the combination with a letter-printing drum comprising a rotatable bed and a channeled type-carrying member removably mounted on said bed, of a structurally independent co-axial rotary type plate bed of smaller diameter than said letter-printing drum, means independent of the type bed for rotating said type plate bed at the same peripheral speed during the impression operation and pressing means for said bed and drum.

25. In a printing and addressing machine, the combination with a letter-printing bed having a type-carrying member removably mounted thereon, of a structurally independent co-axial rotatable type plate bed of smaller diameter than said letter-printing drum and arranged to be rotated during the impression operation at the same peripheral speed as the letter-printing drum, a rotary platen for said drum and bed, and means for periodically feeding type-carrying forms between said type plate bed and platen.

26. In a printing and addressing machine, the combination with a letter-printing drum comprising a rotatable bed having a type-carrying member removably mounted thereon, of a structurally independent co-axial rotary type plate drum of smaller diameter than said letter-printing drum and arranged to rotate with said type carrying member, a rotary platen common to all of said members, and means for periodically feeding type carrying forms between said platen and the type plate bed.

27. The combination with a letter-printing drum comprising a rotary bed and a type-carrying member removably mounted thereon, of a structurally independent co-axial rotary type plate bed of smaller diameter than said drum and arranged to be rotated at the same peripheral speed during the impression operation as said drum, a salutation-carrying member rotatable with said drum, a date-carrying member mounted upon and rotatable with said type plate drum, a rotary platen common to all of said members, means for periodically feeding address forms to said type plate bed, an inking ribbon interposed between said platen and beds for inking the type on the letter-printing drum, the salutation type and the type of the address-carrying form, an independent ribbon for inking the date type, and means for automatically feeding impression-receiving sheets.

28. The combination with a letter-printing drum comprising a rotary bed and a type-carrying member removably mounted on said bed, of a structurally independent co-axial freely rotatable type plate bed of smaller diameter than, and rotatable during the impression operation at the same peripheral speed as, said letter-printing drum, a rotary platen for said drum and bed, means for periodically feeding type plates to said bed, and an inking ribbon interposed between said platen and beds and arranged to move forward synchronously with the type plates.

In testimony whereof, I have hereunto set my hand, this 14th day of October, 1910, in the presence of two subscribing witnesses.

DAVYDD C. HUGHES.

Witnesses:
EDGAR F. BEAUBIEN,
JOHN R. LEFEVRE.